US012448703B2

(12) United States Patent
Shin

(10) Patent No.: US 12,448,703 B2
(45) Date of Patent: Oct. 21, 2025

(54) CONTINUOUS HYDROTHERMAL MANUFACTURING METHOD FOR CONCENTRATION-GRADIENT MONOCRYSTALLINE BATTERY MATERIAL

(71) Applicant: UCHICAGO ARGONNE, LLC, Chicago, IL (US)

(72) Inventor: YoungHo Shin, LaGrange Highlands, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 637 days.

(21) Appl. No.: 17/170,057

(22) Filed: Feb. 8, 2021

(65) Prior Publication Data

US 2022/0251728 A1    Aug. 11, 2022

(51) Int. Cl.
| | | |
|---|---|---|
| C30B 29/22 | (2006.01) | |
| C01D 15/02 | (2006.01) | |
| C01G 53/44 | (2025.01) | |
| C01G 53/50 | (2025.01) | |
| C01G 53/82 | (2025.01) | |
| H01M 4/505 | (2010.01) | |
| H01M 4/525 | (2010.01) | |

(Continued)

(52) U.S. Cl.
CPC ............. *C30B 29/22* (2013.01); *C01D 15/02* (2013.01); *C01G 53/44* (2013.01); *C01G 53/50* (2013.01); *C01G 53/82* (2025.01); *H01M 4/505* (2013.01); *H01M 4/525* (2013.01); *H01M 10/0525* (2013.01); *C01P 2004/80* (2013.01); *C01P 2004/84* (2013.01); *H01M 2004/021* (2013.01)

(58) Field of Classification Search
CPC ....... C01G 53/006; C01G 53/44; C01G 53/50
See application file for complete search history.

(56) References Cited

U.S. PATENT DOCUMENTS 9,843,035 B2 * 12/2017 Noh .......................... B01J 4/002
9,865,874 B2 *  1/2018 Noh .......................... B01J 3/008
(Continued)

FOREIGN PATENT DOCUMENTS

CN   102713243 A  * 10/2012  ............. F02M 33/08
JP      4941692 B2 *  5/2012
(Continued)

OTHER PUBLICATIONS

Lee et al (Synthesis of manganese oxide particles in supercritical water, Korean J. Chem. Eng., 23(5), 714-719 (2006).*
(Continued)

*Primary Examiner* — Jun Li
(74) *Attorney, Agent, or Firm* — Foley & Lardner LLP

(57) ABSTRACT

The invention provides a battery material comprising-monocrystalline particles not having internal void fractions, wherein each of the monocrystalline particles is without internal grain boundaries such that anisotropic volume change issues of polycrystalline particles don't occur when the particles are charged and discharged during cycling. Also provided is the monocrystalline particles with less-lithium on the particle surface. Also provided is a method for preparing monocrystalline battery material, wherein the battery material may be incorporated into a secondary battery.

13 Claims, 9 Drawing Sheets

(51) Int. Cl.
*H01M 10/0525* (2010.01)
*H01M 4/02* (2006.01)

(56) References Cited

U.S. PATENT DOCUMENTS

| | | | | |
|---|---|---|---|---|
| 2013/0129596 | A1* | 5/2013 | Noh | C01G 49/02 |
| | | | | 422/162 |
| 2016/0233488 | A1* | 8/2016 | Krkljus | H01M 4/625 |
| 2018/0034050 | A1* | 2/2018 | Son | H01M 4/0471 |
| 2019/0300383 | A1* | 10/2019 | Ren | H01M 4/0471 |

FOREIGN PATENT DOCUMENTS

| | | | | | |
|---|---|---|---|---|---|
| KR | 20130134224 | A | * | 12/2013 | |
| KR | 20130134228 | A | * | 12/2013 | |
| KR | 20140069722 | A | * | 6/2014 | |
| KR | 20200029227 | A | * | 3/2020 | C01G 25/006 |

OTHER PUBLICATIONS

Machine translation of Okuda (JP4941692B2), publication date May 30, 2012.*
Machine translation of KR20130134228A, pulication date Dec. 10, 2013.*
Machine translation of Seung et al (KR20140069722A), publication date Jun. 10, 2014.*
Machine translation of Seung'224 (KR20130134224), publication date Dec. 10, 2013.*

* cited by examiner

PRIOR ART

CONTINUOUS HYDROTHERMAL MANUFACTURING METHOD FOR CONCENTRATION-GRADIENT MONOCRYSTALLINE BATTERY MATERIAL

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to battery materials and more specifically, this invention relates to monocrystalline materials for battery cathodes and a method for making same.

2. Background of the Invention

Lithium secondary batteries with high energy density and voltage, long lifespan, and low self-discharge rate are sought for use in mobile devices and electric vehicles. For example, cathode materials are being developed to meet the requirements of future electric automobile applications, those cathodes generally comprising nickel-rich or lithium-rich compounds. These compounds are promising for their relatively high energy density, reversible capacity, low toxicity, and low cost, However, lithium secondary batteries have a limit in that their lifespan is rapidly reduced by repeated charging and discharging, wherein lithium extraction insertion occurs. This cycling generates impurities on the surfaces of the primary particles. Also, moisture or other factors in the battery can degrade the electrolyte, deteriorate the active material, or increase the internal resistance of the battery. An of these factors cause an increase in impedance on the surface of the cathode's primary particles (i.e., those particles which, when agglomerated, make up the polycrystalline secondary cathode particle).

As to the physical structure of state of the art cathode materials, anisotropic volume changes of individual primary particles during lithium extraction/insertion makes polycrystalline materials currently used in Li-ion cells vulnerable to grain-boundary (and inter-granular) fracture. This leads to rapid impedance growth and capacity decay. Current polycrystalline secondary cathode particles are agglomerations of primary particles and are about 300 nm in size. There are grain boundaries between these primary particles, and internal void fractions are formed. So, as charging and discharging are repeated, fracture of the interface between primary particles is compounded, the aforementioned impurities are formed, and impedance is increased.

State of the art polycrystalline secondary particles each have a random orientation of primary particles in their interiors. Each of those primary particles experience anisotropic volume changes during charge and discharge cycling. Therefore, mechanical stress accumulated along the grain boundary regions between primary particles during anisotropic volume changes result in secondary particle crack and capacity fade.

The inter-granular fracture disrupts the electronic and ionic conduction pathway and dramatically increases particle surface area, aggravating surface-related degradation including surface phase transformation, transition metal dissolution, lattice oxygen release, and electrolyte decomposition.

Given the aforementioned problems with polycrystalline structures, monocrystalline cathode materials have been studied. State of the art monocrystalline material is obtained by solgel, co-precipitation, molten salt, or flux process for crystal growth. The resulting monocrystalline material is then mixed with a lithium source as a precursor to heat treatment.

For monocrystalline particle growth during this heat treatment, higher temperatures and longer residence times are required than for the production of typical polycrystalline materials. Two stages of heat treatment may be applied, with milling after heat treatment required, Energy loss and productivity decline are inevitable, Generally, the cathode material is produced by heat treatment of the mixture of a nickel cobalt manganese precursor material and a lithium source material. This heat treatment causes the lithium to dissolve and permeate into the nickel cobalt manganese precursor particles. Lithium particles melt at high temperature and then lithium propagates into the precursor particle to become the cathode particle. So, while lithium, initially present at a high concentration outside the precursor particles, moves into the precursor particles, residual lithium inevitably remains on the outside surface of the newly created cathode particle because of imperfect mass transfer. This residual lithium compound may adhere to the cathode particle surface in the form of small particles with grain boundaries of their own.

As a result of the aforementioned intrinsic mass transfer limitation of the afore-described solid-phase reaction, excess lithium exists on the surface of the nickel cobalt manganese oxide particles, and a lower lithium concentration is formed inside the nickel cobalt manganese oxide particles than their surface. The excess lithium present on the surface of the polycrystalline NMC cathode particles thus formed reacts with moisture or $CO_2$ in the air to easily form surface impurities such as $Li_2CO_3$ and LiOH. Further, it may react with the electrolyte and cause undesirable by-products. Because there are many voids between the primary particles constituting the polycrystalline particle, residual lithium may cause undesirable by-products on the grain boundaries of the primary particles inside the polycrystalline particle. The voids that connect the particle core to the surface could provide channels for electrolyte penetration, exposing the particle interior to the deleterious electrolyte reactions. When cracks are developed inside the polycrystalline particle, lithium impurities are also developed in the voids (grain boundaries) by reaction with $CO_2$, $H_2O$, electrolyte, etc. The extent of the cracks in the particle may be severe enough to allow electrolyte penetration, making the particle vulnerable to impurity development and leading to an increased rate of capacity fading.

When these undesirable impurities are formed on the surface and/or the inside of the polycrystalline NMC cathode particles, it may cause performance degradation such as a decrease in capacity and rate performance of the battery and serious safety problems such as gas generation and expansion inside the battery.

Given that the polycrystalline NMC cathode particle is an agglomeration of primary particles, the undesirable lithium-containing impurities that may form inside the secondary cathode particle (and particularly on the surface of the primary particles which form grain boundaries inside the secondary particle) cause battery performance degradation.

FIGS. 1A and 1B are scanning electron microscope (SEM) images of prior art polycrystalline particle clusters. Specifically, FIG. 1A is a scanning electron microscope image of state of the art cathode particle clusters (e.g., polycrystalline MNC811). FIG. 1B is a magnified scanning electron microscope image of a cross section of a particle cluster and shows voids and grain boundaries between primary particles. Fracturing between particles comprising the cluster can be readily seen in FIG. 1B.

In summary of this discussion related to producing polycrystalline materials, conventional cathode synthesis methods of polycrystalline materials generate lithium-excess on the secondary particle surface during heat treatment of the mixture of precursor particles and lithium source particles, But this results in undesirable by-products on the surface, eventually deteriorating the electrochemical performance of cathode particles. Repeated, non-uniform contraction and expansion during cycling generated internal cracks that connected to the particle surface, opening channels for electrolyte infiltration into the particle interior. As particle fracture progresses, the degradation becomes more severe.

To overcome the disadvantages of the aforementioned polycrystalline materials, efforts have been made to develop a grain-boundary-free monocrystalline cathode particle without excess lithium on its surface, and therefore resistant to particle fracture. But such a particle continues to elude researchers. This is because monocrystalline material produced through standard heat treatment has several disadvantages in electrochemical performance. Due to the high temperature and long residence time of standard procedures, the capacity of the created monocrystalline particles decreases. Specifically, the higher sintering temperatures used to promote particle sintering forms large grains, which leads to increased structural disorder (such as Li-Ni mixing and oxygen vacancy). This negatively affects electrochemical performance.

Also, and counterintuitively, while the particle size of the monocrystalline material generated via state of the art processes is nano-sized (e.g., about 100 nm) and therefore smaller than micron-sized (e.g., 10 micron) polycrystalline material, the former cannot be packed as densely on a current collector. This is because the nano-sized monocrystalline material particles have different orientations and shapes from each other. (The smaller and more non-spherical, the lower the packing density of particles). So the stress caused by different orientations and volume changes of the individual particles causes stress within the polycrystalline material, and this causes cracking along the grain boundaries between primary particles.

A need exists in the art for a new synthesis process to produce monocrystalline particles with improved electrochemical performance. In addition, it is necessary to remove residual lithium, which is excessively present as impurities on the surface of monocrystalline particles obtained by state of the art processes.

The process should produce micron-size (e.g., less than 20 microns, and preferably less than 3 microns) monocrystalline primary particles without excess lithium on their surface and with desired morphology and size. The system should produce monocrystalline particles without internal void fractions or grain boundaries. The system should provide high precision, rapid and in-situ control of monocrystalline particle morphology and size distribution through modifications in reaction pressure, temperature, residence time, reactant concentration, solvent type, and a combination of these parameters. These monocrystalline particles may then be used for cathode material after heat treatment or may be combined to form larger granulated particles by adding constituents.

SUMMARY OF INVENTION

An object of the invention is to provide monocrystalline particles and process for producing those particles that overcomes many of the drawbacks of the prior art.

A primary objective of the invention is to produce monocrystalline particles which are crack free (either initially or after cycling) and which contain no lithium impurities on their surfaces. A feature of the invention is that the resulting particle is about 0.1 µm to 20 µm in diameter. An advantage of the invention is that when the size of the monocrystalline material is about 1 micron or more, it can be packed more densely than polycrystalline material. This is because there are no voids inside the monocrystalline material. So, as the size of the monocrystalline material increases, the decrease in packing density caused by having different shapes (as seen in state of the art particles) is alleviated. Another advantage of the invention is that when the invented particles are mixed or connected together with carbon-based material, metal powder, conductive polymer, self-healing polymer, or solid electrolyte to form clusters, no individual particle cracking, or cracking between particles, occurs inside the constituent monocrystalline cluster. As such, lithium impurity and impedance increases are reduced. Another advantage is that the cluster uniformly contracts and expands during repeated cycling. Overall, the cluster experiences uniform contraction and expansion due to the offset effect of individual monocrystalline particles. This is because the cluster is without voids or cracks between or within the individual monocrystalline particles making up the cluster.

Another object of the invention is to provide monocrystalline particle clusters (i.e., agglomerations) and a process for producing those clusters wherein smaller particles comprising those monocrystalline particle clusters are without void fractions or grain boundaries. A feature of the invention is utilization of a continuous (i.e. not a batch) hydrothermal process to produce those smaller monocrystalline particles. An advantage of the invention is that the monocrystalline particle clusters produced by the invented method suppress cracking during charge and discharge.

Still another object of the invention is to provide an efficient method for producing monocrystalline particles which do not have external residual lithium and have less lithium at their surface than at their core. This monocrystalline particle comprises a lithium-deficient particle shell having a Li/transition metal molar ratio of less than that of the particle's core. A feature of the system is the utilization of a supercritical hydrothermal process to synthesize lithiated monocrystalline particles followed by rapid removal of any remaining surface lithium impurities of the formed particles by subsequent water contact during cool down and particle separation. Heat treatment is applied only once when synthesizing the particles and/or the resulting cathodes comprised of the particles (although subsequent drying by heat application is used to dry the synthesized particles). An advantage of the method is to reduce the state of the art three-step process of 1) preparing a precursor, 2) heat treating for lithiation, and 3) cathode washing (for removing lithium), to one step.

Yet another object of the present invention is to provide a battery material comprising monocrystalline particle clusters. A feature of the material is that the particles have no grain boundaries, nor do the particles have internal void fractions. An advantage of the material is that it has superior cyclability and fast charge capability. Another advantage is that density per unit volume can be higher in the invented monocrystalline particles because the particles have no internal voids compared to state of the art polycrystalline particles. These superior qualities (good rate capability and cycle life without deteriorating initial discharge capacity) results from increases in the transport rate of lithium ions and increased fracture resistance in the particle.

Another object of the present invention is to provide a continuous method for producing battery materials. A feature of the invention is that reactants are continuously injected and product is continuously collected. An advantage of the invention is that more consistent monocrystalline structure is produced compared to batch processes. Another advantage is that surface modifications of the crystal can be made in the same reactor sequence but in a separate downstream reactor or process maintained at between about 20° C. and 150° C.

Briefly, the invention provides a monocrystalline particle having a core and a surface, wherein the particle has a grain boundary free core structure, and lacks residual lithium compound on its surface, wherein the particle has less lithium concentration at and proximal to its surface than at and proximal to its core.

The invention also provides a method for preparing monocrystalline battery material, the method comprising continuously supplying an aqueous metal salt solution at ambient temperature and reaction pressure; supplying a basic aqueous solution with chelating agents at ambient temperature and reaction pressure continuously, wherein the metal salt solution and the basic aqueous solution are initially supplied separately so as to be chemically isolated from each other; mixing the aqueous metal salt solution and the basic aqueous solution together with supercritical water to establish hydrothermal reaction conditions to form monocrystalline particles; and contacting the monocrystalline particles with a room-temperature fluid to modify the surface of monocrystalline particles. In an embodiment of this continuous process, when injecting the metal salt solution and the basic aqueous solution via pumps into the reaction environment (such as a vessel or reaction chamber) containing the supercritical water, the injection pressure must be equal to or higher than the reaction pressure maintained in the environment. The pressure in all sections from the feed pump to the de-pressurizer is the same as the reaction pressure.

The invention further provides a device of the continuous hydrothermal reaction for preparing the lithium-excess-cored and lithium-deficient-shelled concentration-fluctuating monocrystalline particles for a lithium secondary battery, the device comprising: a first feed, a second feed, a third feed, and a fourth feed; a thermal jumper for non-gradual increasing the temperatures of the first and second feeds to a hydrothermal reaction temperature by a supercritical water supply under a hydrothermal reaction pressure; a main reactor for hydrothermal reaction; a thermal sinker for non-gradual decreasing the temperature of the effluent from the main reactor by the third feed supply; an auxiliary reactor for keeping below the supercritical water temperature and below the effluent temperature of the main reactor; a heat exchanger to cool the effluent from the auxiliary reactor and to heat the fourth feed; a supercritical water heater to supply the supercritical water to the thermal jumper; a de-pressurizer to depressurize and discharge the effluent from hydrothermal reaction; and a phase separator to separate the reaction product into each phase.

The invention also provides a clustered battery material comprising individual monocrystalline particles not having internal void fractions, wherein each of the monocrystalline particles are without internal grain boundaries such that no cracks occur in the clustered battery material when the particles are subjected to charging and discharging cycles. Specifically, an active battery material for a lithium secondary battery including lithium-excess-cored and lithium-deficient-shelled concentration-fluctuating monocrystalline particles is provided, In an embodiment of the invention, each of monocrystalline particles comprise at least two concentration-fluctuating metal components having concentration changes with respect to the circumferential and radial directions of the particle. Monocrystalline materials with a size of 1 micron or larger may be used in the battery by themselves to replace the currently used polycrystalline cathode materials. However, monocrystalline materials with a size of less than 1 micron may be used to form clustered particles through granulation.

As described infra, the invention provides monocrystalline materials with particle sizes between 0.1 μm and 20 μm, which have no internal voids and no internal grain boundaries. The packing density of the invented micron-sized monocrystalline material may increase by an additional 3 percent to 10 percent of that of polycrystalline material. The result is micron-sized monocrystalline material with increased volumetric cell capacity.

Also provided is a method for preparing monocrystalline battery material, the method comprising supplying an aqueous metal salt solution at room temperature and reaction pressure to a thermal jumper; supplying a basic aqueous solution (such as potassium hydroxide solution, sodium hydroxide solution, and lithium hydroxide solution) with chelating agents (such as ammonium hydroxide) at room temperature and reaction pressure to the thermal jumper; supplying supercritical water with or without oxygen at reaction pressure to the thermal jumper to implement hydrothermal reaction condition in a main tubular reactor; generating monocrystalline particles by the first step hydrothermal reaction in the main tubular reactor; injecting room-temperature solution into a thermal dropper/sinker connected between the main tubular reactor outlet and an auxiliary tubular reactor inlet to modify the surface of monocrystalline particles from the main tubular reactor; modifying the surface of monocrystalline particles from the main tubular reactor by the second step hydrothermal reaction in the auxiliary tubular reactor, with concentration variation; discharging the product to a gas-liquid-solid separator atter a heat exchanger and a de-pressurizer; and washing and thermally treating the product.

An embodiment of the invention provides a method for preparing lithium-excess-cored and lithium-deficient-shelled concentration-fluctuating monocrystalline particles for a lithium secondary battery, including preparing a first feed solution, a second feed solution, a third feed solution, and a fourth feed solution; and mixing the solutions under a reaction temperature between 300° C. and 600° C. and a reaction pressure between 85 and 500 bar (and more preferably between 120 bar and 300 bar); producing lithium-excess concentration-fluctuating particles by hydrothermal reaction; removing lithium from the surfaces of lithium-excess concentration-fluctuating particles by subsequent water contact during cooling and phase separation, and filtering and drying of the thus-obtained particles; and either calcination or granulation and subsequent calcination.

Also provided is a cathode material for a lithium secondary battery, comprising a monocrystalline particle, wherein the monocrystalline particle is a lithium transition metal oxide particle comprising a lithium-excess transition metal oxide core having a Li/transition metal molar ratio of more than 1. Described differently, the monocrystalline particle may be a lithium transition metal oxide particle comprising a lithium-deficient transition metal oxide shell having a Li/transition metal molar ratio of less than that of lithium-excess transition metal oxide core. The average lithium concentration in the shell may be 90 to 99.5 percent of that of the core, and preferably 95 to 99 percent.

Also provided is to a method to make lithiated, concentration-fluctuating particles by hydrothermal reaction and to remove residual lithium from the particle surface by subsequent water contact. The process may or may not be continuous. In an embodiment of this method, a continuous method for preparing monocrystalline battery material, the method comprising supplying an aqueous metal salt solution at ambient temperature and reaction pressure; supplying a basic aqueous solution with chelating agents at ambient temperature and reaction pressure; wherein the aqueous metal salt solution and the basic aqueous solution are initially supplied separately so as to be chemically isolated from each other; mixing the aqueous metal salt solution and the basic aqueous solution together with supercritical water to establish first hydrothermal reaction conditions to form monocrystalline particles; and subjecting the monocrystalline particles with a second hydrothermal reaction condition to modify the surface of monocrystalline particles.

Specifically, the monocrystalline particle is a lithium transition metal oxide particle comprising at least two concentration-fluctuating metal components having concentration changes with respect to the circumferential and radial directions of the particle.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
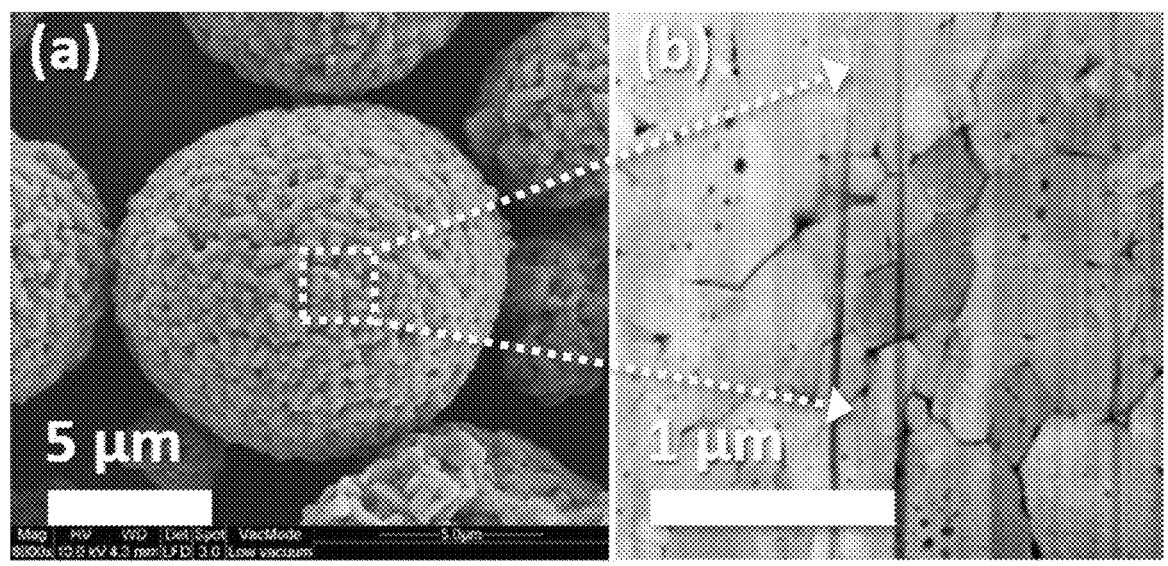
FIG. 1A is a scanning electron microscope image of a state of the art cathode particle (e.g., polycrystalline MNC811)
FIG. 1B is a scanning electron microscope image of a cross section of a magnified view of the state of the particle depicted in FIG. 1A.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As noted supra, in order to increase the capacity of a battery, it is preferable that cathode particles have a large size. But given the nature of spherical particles, larger spheres results in the active area in contact with the electrolyte decreasing, leading to a deterioration of the rate capability and initial capacity. Since such state of the art polycrystalline particles are composed of a cluster of primary particles with a size of about 300 nm, grain boundaries are formed, and void fraction is formed inside the clusters. This results in rapid impedance growth and capacity decay.

In a counterintuitive approach, the inventors found that when using smaller monocrystalline particles, the Ni-rich NMC's cycle performance, as well as rate charging capability, is improved by eliminating the internal grain boundaries and inter-granular fracture. This improved charge rate capability is ascribed to the short Li-ion transport pathways and large surface-to-volume ratio which could facilitate the diffusion of Li-ion and structural stability of grain-free monocrystalline particles.

This invention provides monocrystalline particles that have no internal cracks, void fractions, or grain boundaries. These particles can be gathered or agglomerated to form clusters. Each monocrystalline particle within the cluster forms a grain boundary with adjacent particles. The monocrystalline particles that make up the cluster are not fractured or individually broken, but the junctions between the particles may be a weak point for cracking. So while the individual particles do not fracture, the entire cluster may fracture along these junctions during charge and discharge cycling. Inasmuch as there are hundreds if not thousands of these junctions, and inasmuch as the individual monocrystalline particles have orientations different from each other, the entire cluster expands in all directions.

However, in an embodiment of the invention, the aforementioned stress and cracking on the cluster can be overcome by using a flexible filler, such as self healing polymer, adhesive, or "mortar." The filler is disposed between the individual particles such that the filler contacts the particles and holds the particles in place in a flexible mass. The filler may be any material that does not induce chemical change in a battery. However, the filler has electron conductivity. For example, the filler may comprise a compound selected from the group consisting of graphite, other carbon-based material such as carbon nanotube and graphene, metal powder (e.g., copper, nickel, aluminum, silver, zinc oxide, titanium oxide, potassium titanate), polymer (e.g., ethylene carbonate, propylene carbonate, diethyl carbonate, dimethyl carbonate), conductive polymer (e.g., polyacetylene, polyphenylene vinylene, polypyrrole, polyaniline), self-healing polymer (e.g., polyborosiloxane) or solid electrolyte (e.g., $Li_7La_3Zr_2O_{12}$, $Li_{10}GeP_2S_{12}$) and combinations thereof. As long as this flexible filler is electrically conductive, a flexible cluster results that connects the individual monocrystalline particles but without cracking. In summary of this point, if a self-healing polymer is used there are no voids between monocrystalline particles. Therefore, the entire construct uniformly contracts and expands repeatedly without cluster cracking during charging and discharging.

Figure 6:
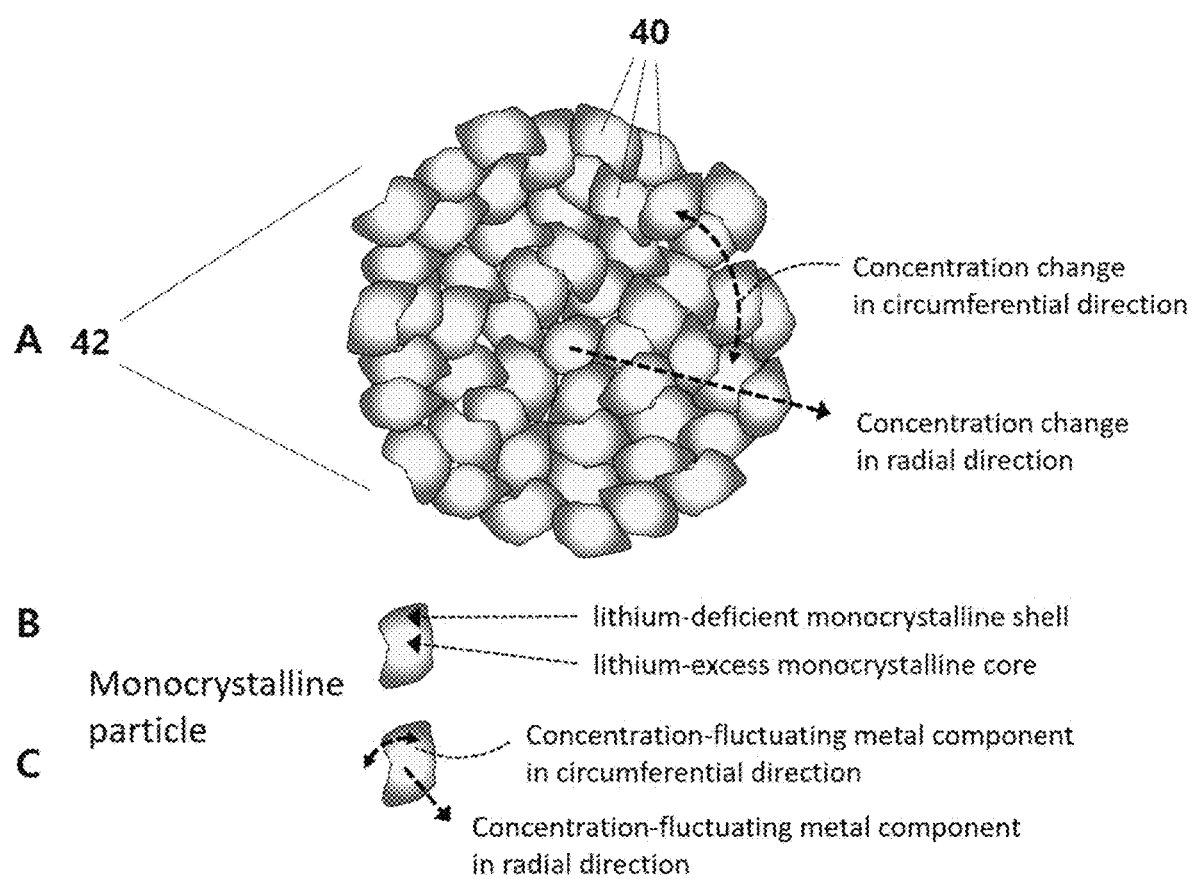
FIG. 6A is a schematic drawing illustrating an example of a granulated cluster composed of lithium-excess-cored and lithium-deficient-shelled monocrystalline particles, in accordance with features of the present invention.
FIG. 6B is a schematic drawing of a monocrystalline particle showing relative lithium concentrations on its shell versus its core, in accordance with features of the present invention.
FIG. 6C is a schematic drawing of a monocrystalline particle showing circumferential and radial gradients of metal concentrations, in accordance with features of the present invention.

Monocrystalline particles produced by the invented hydrothermal process can be made into the aforementioned particle clusters using a spray dryer or granulator (FIG. 6). As discussed infra, if the first feed contains metal solid particles, the hydrothermal process can directly create clusters.

These advantages of this monocrystalline particle structure without internal grain boundaries and inter-granular fracture are applied to various lithium transition metal oxides such as $LiCoO_2$, $LiMnO_2$, $LiMn_2O_4$, $LiFePO_4$, $LiNiO_2$, $Li(Ni_xCo_yMn_z)O_2$, and $xLi_2MnO_3 \cdot (1-x)LiMO_2$ (M=Co, Ni, and Mn), and solid electrolyte materials such as $Li_7La_3Zr_2O_{12}$.

The invention provides relatively small monocrystalline particles, a method for continuously producing the particles, and a method for producing battery materials comprising the particles. Any reference of "continuously" herein refers to a non-batch process, such that reactants are continuously injected and products are continuously collected.

To enable the production of monocrystalline particles without internal void fractions or grain boundaries, continuous hydrothermal manufacturing is used. The invented process provides high precision, rapid, and in-situ control of monocrystalline particle morphology and size distribution through adjusting reaction pressure, reaction temperature, reaction time, reactant concentration, solvent type, additives, etc. In an embodiment of the invention, the hydrothermal process synthesizes lithiated monocrystalline particles and then, by water contact during cooling, firstly removes lithium remaining outside the particles (which doesn't participate in the particle crystal structure) and also partially dissolves lithium at the particle surfaces (which participates in the particle crystal structure).

Another embodiment of the present invention provides a method of preparing lithium-excess-cored and lithium-deficient-shelled concentration-fluctuating monocrystalline particles for a lithium secondary battery. The method comprises preparing a first feed solution, a second feed solution, a third feed solution, and a fourth feed solution; and mixing the solutions under a reaction temperature between 300° C. and 600° C. and a reaction pressure between 85 bar and 500 bar; producing lithium-excess concentration-fluctuating particles by hydrothermal reaction; removing lithium from the surfaces of lithium-excess concentration-fluctuating particles by subsequent water contact during cooling and phase separation, and filtering and drying of the thus-obtained particles; and either calcination or granulation and subsequent calcination. According to a further another embodiment of the present invention, there is provided an active battery material electrode for a lithium secondary battery, including the lithium-excess-cored and lithium-deficient-shelled concentration-fluctuating particles. The active battery material electrode comprises a compound selected from the group; consisting of such as graphite, carbon-based material, carbon nanotube, graphene, metal powder (e.g., copper, nickel, aluminum, silver, zinc oxide, titanium oxide, potassium titanate), polymer (e.g., polyvinylidene fluoride, ethylene carbonate, propylene carbonate, diethyl carbonate, dimethyl carbonate), conductive polymer (e.g., polyacetylene, polyphenylene vinylene, polypyrrole, polyaniline), self-healing polymer (e.g., polyborosiloxane) or solid electrolyte (e.g., $Li_7La_3Zr_2O_{12}$, $Li_{10}GeP_2S_{12}$) and combinations thereof. The active battery material electrode may comprise any material that may not induce chemical change in a battery and have electron conductivity.

According to a further another embodiment of the present invention, there is provided a lithium secondary battery including the active battery material electrode.

Another embodiment of the invention provides clusters of monocrystalline particles, such that each of the clusters define at least one concentration change of constituents from its core to its surface. The clustered particles comprise at least two particulate constituents selected from the group consisting of Li, B, C, F, Na, Mg, Al, Si, S, Ca, Sc, Ti, V, Cr, Mn, Fe, Co, Ni, Cu, Zn, Ga, Ge, Sr, Y, Zr, Nb, Mo, Ru, Ag, In, Sn, Sb, Ba, La, W, and Bi. Each of the monocrystalline particles comprise a single composition, such that the cluster may be comprised of two or more types of monocrystalline particles.

The clustered materials are made up of monocrystalline particles having a shape selected from the group consisting of spherical, non-spherical, elliptical, oval, convex, concave, leaf, needle, plate, polyhedron, sloped polyhedron, slanted polyhedron, curved polyhedron, and combinations thereof. In an embodiment of the invention, all of the monocrystalline particles may be of the same shape. In another embodiment of the invention some of the monocrystalline particles have shapes different than other monocrystalline particles within the same cluster. In this embodiment, the particles of a first shape may be grouped in a region (for example the core) of the particle that is different that particles of a second shape inhabiting a different region (for example the shell) of the particle. The monocrystalline particles have a size between 0.1 µm and 20 µm, preferably between 0.3 µm and 6 µm and more preferably between 0.3 µm and 3 µm.

In an embodiment of the invention, all of the monocrystalline particles are approximately the same size. In another embodiment of the invention some of the monocrystalline particles have sizes different than other monocrystalline particles within the same cluster. In this embodiment, the particles of a first size may be grouped in a region of the particle that is different that particles of a second size.

These monocrystalline particles may be combined to form larger clustered particles, but the nature of these larger clustered particles is also monocrystalline inasmuch as no polycrystalline constituents are present. When making a clustered material through subsequent agglomeration or granulation process (e.g., spray drying, a separate downstream process) of monocrystalline particles produced by the invented hydrothermal process, each of the monocrystalline particles may be physically connected to each other by a conductive material such as carbon-based material, metal powder, polymer, or solid electrolyte. This physical connection may result in the individual particles being immobilized relative to each other. It should be noted that the lithium-excess-cored and lithium-deficient-shelled concentration-fluctuating particles can be mixed with carbon-based material, metal powder, polymer, and solid electrolyte without cluster forming step to directly make an active battery material electrode.

Figure 7:
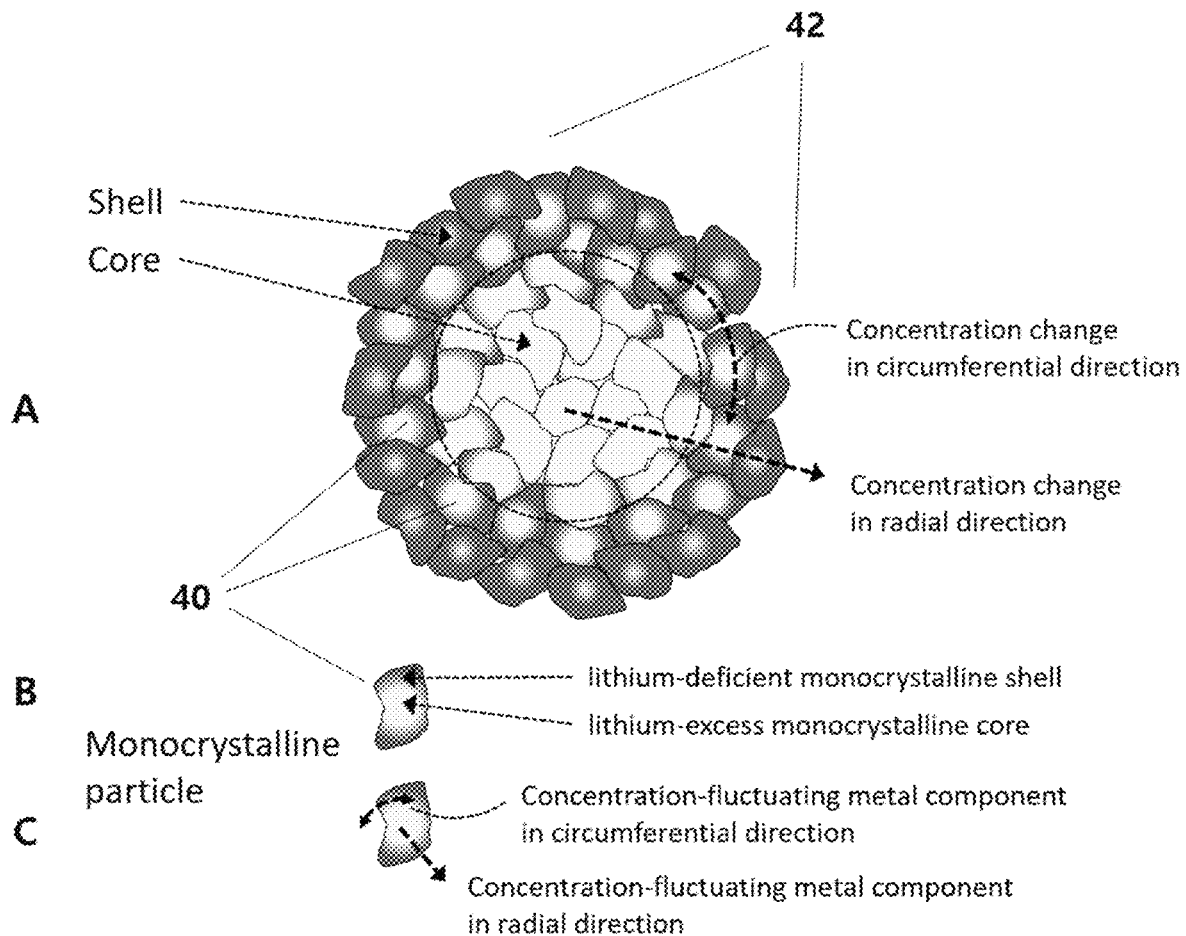
FIG. 7A is a schematic drawing illustrating concentration variants within a particle cluster caused by concentration variants within monocrystalline particle constituents, in accordance with features of the present invention.
FIG. 7B is a schematic drawing illustrating the core and shell concentration variants within the monocrystalline particle comprising the cluster depicted in FIG. 7A.
FIG. 7C is a schematic drawing illustrating the circumferential and radial concentration variants within the monocrystalline particle comprising the cluster depicted in FIG. 7A.

When the monocrystalline particles (each having no cracks, or no lithium impurity on their surface) are mixed with carbon-based material, metal powder, polymer, or solid electrolyte to form clusters, the clusters may contain no voids. The formation of Lithium impurities decreases as does impedance. These clustered particles have concentration changes with respect to their circumferential and radial directions of the clustered particle of at least two particulate constituents selected from the group consisting of Li, B, C, F, Na, Mg, Al, Si, P, S, Ca, Sc, Ti, V, Cr, Mn, Fe, Co, Ni, Cu, Zn, Ga, Ge, Sr, Y, Zr, Nb, Mo, Ru, Ag, In, Sn, Sb, Ba, La, W, Ta, Bi, and combinations thereof. This is illustrated in FIGS. 6 and 7.

The battery materials therefore comprise a plurality of particles such that when combined, the plurality exhibits a continuous, non-gradual, or discrete change in element concentrations from the core to the surface of the particle. For example, the concentration change exhibits a nonlinear increase or decrease from the core to the surface of the particle in a shape selected from the group consisting of a sine wave, a square, step, triangle, saw-tooth, an exponential curve, and combinations thereof.

Figure 2:
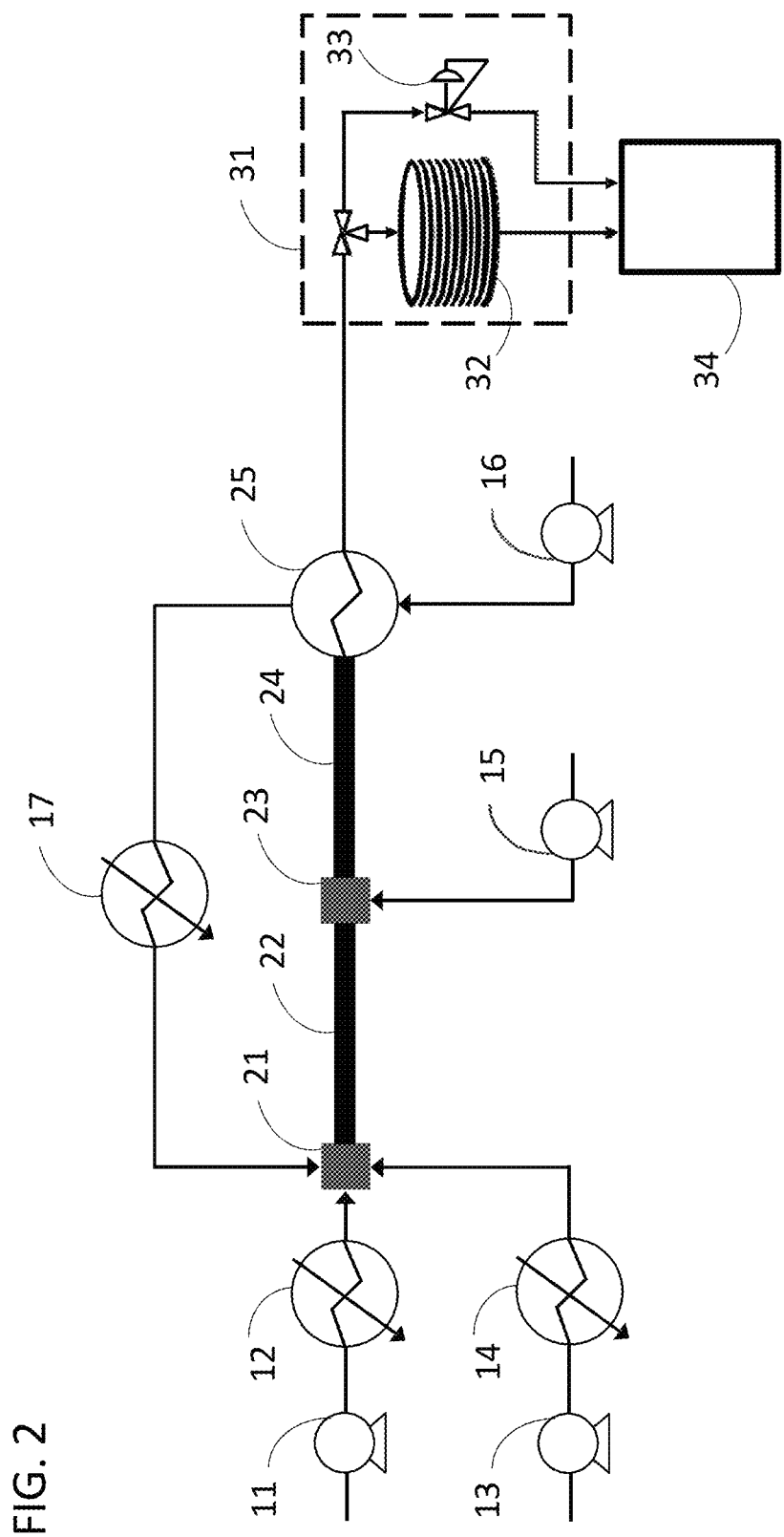
FIG. 2 is a schematic drawing illustrating a device of the continuous hydrothermal reaction for preparing the lithium-excess-cored and lithium-deficient-shelled concentration-fluctuating monocrystalline particles for a lithium secondary battery, in accordance with features of the present invention.

A schematic drawing illustrating the device of the continuous hydrothermal process for preparing the lithium-excess-cored and lithium-deficient-shelled concentration-fluctuating monocrystalline particles for a lithium secondary battery is shown in FIG. 2. The device comprises a first feed pump 11 situated upstream of and in fluid communication with a first feed heater 12, and a second feed pump 13 positioned upstream and in fluid communication with a second feed heater 14.

Figure 8:
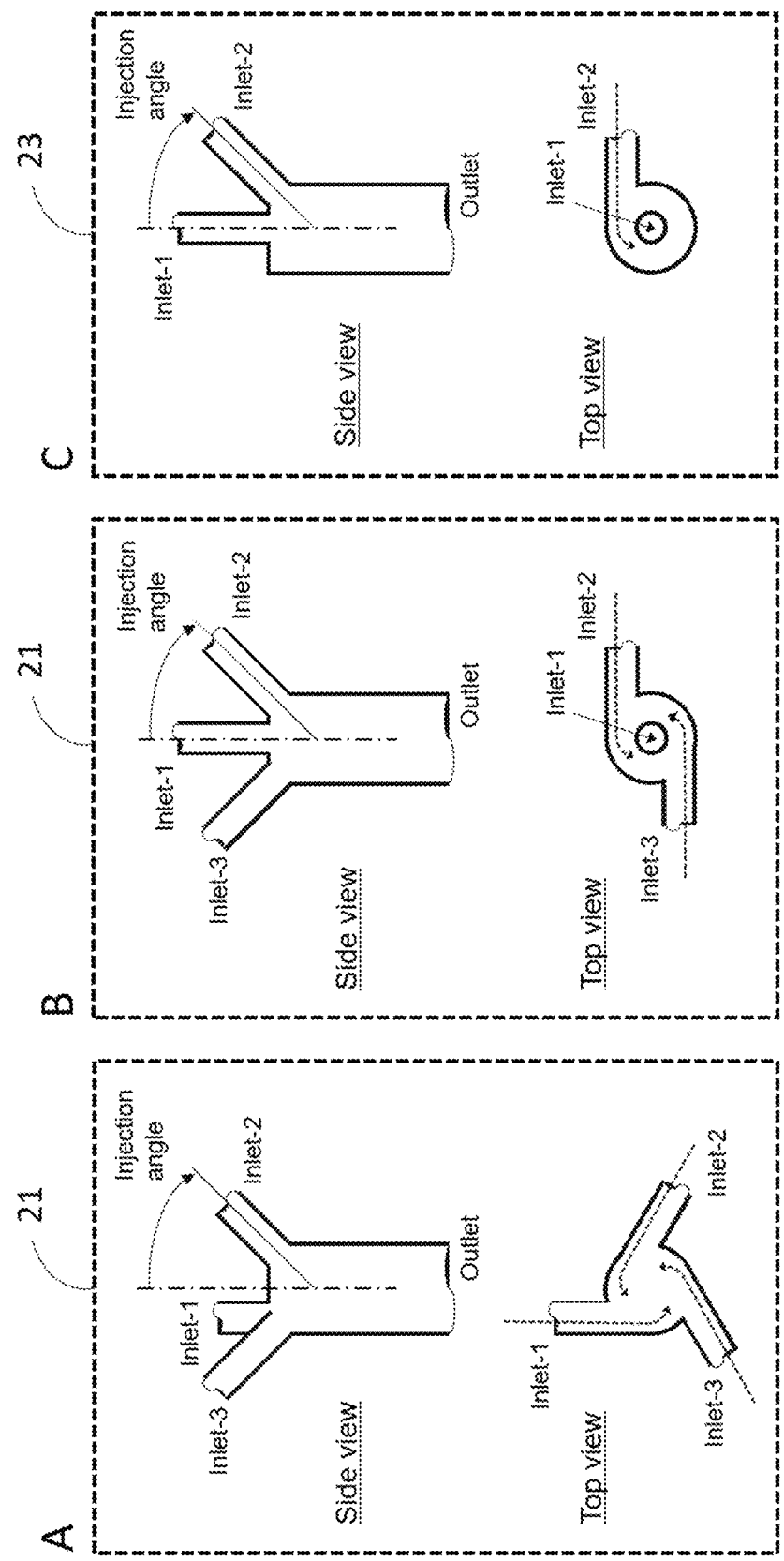
FIG. 8A is a schematic drawing of a thermal jumper with three tangential injections generating vortex flow, in accordance with features of the present invention.
FIG. 8B is a schematic drawing of a thermal jumper with one central injection and two tangential injections generating vortex flow, in accordance with features of the present invention.
FIG. 8C is a schematic drawing of a thermal sinker with one central injection and one tangential injection generating vortex flow, in accordance with features of the present invention.

A fluid mixing structure (hereinafter referred to as the thermal jumper 21) is positioned downstream from both the first and second feed heater. Details of the fluid mixing structure are discussed below as FIG. 8.

A main reactor 22 is positioned downstream and in fluid communication with the thermal jumper. The thermal jumper provides a condition for generating monocrystalline metal particles by forming conditions for rapid supersaturation of the metal components of the first feed and second feed.

Downstream and in fluid communication with the jumper 21 is a first (main) reactor 22, then a second (auxiliary) reactor 24. Disposed between the two reactors is a thermal sinker 23 such that the thermal sinker establishes thermal and fluid communication between the two reactors. A third feed pump 15 is in fluid communication with the thermal sinker 23.

A heat exchanger 25 is positioned downstream from the second reactor 24, and in fluid communication with the second reactor 24. A fourth feed pump 16 is in fluid communication with the heat exchanger 25. A supercritical water heater 17 is positioned between the heat exchanger 25 and the thermal jumper 21 so as to be downstream from the heat exchanger 25 and upstream from the thermal jumper 21.

A de-pressurizer 31 is positioned downstream and in fluid communication with the heat exchanger 25, followed by a phase separator 34.

The first feed comprises a metal salt solution, or a carbon-containing solution, or monocrystalline metal solid particles, or agglomerated metal solid particles, or carbon-containing solid particles, or biomass, or combinations thereof. The metal solid particles and the agglomerated metal solid particles may comprise a nickel cobalt manganese-containing oxide, hydroxide, oxyhydroxide, halogenide, nitrate, carbonate, acetate, oxalate, citrate, sulfate, or may be a mixture of two or more thereof. (For example, nickel solid particles may comprise nickel oxide (NiO) particles, nickel hydroxide (Ni(OH)$_2$) particles, and nickel carbonate ($NiCO_3$) particles). The first feed is injected into the thermal jumper 21 at reaction pressure using the first feed pump and then heated between 50° C. and 299° C. by the first feed heater. The first feed heater prevents the precipitation of the first feed, increases energy efficiency, and improves operational stability while maintaining a constant injection temperature to the thermal jumper.

When the first feed comprises agglomerated metal solid particles, by the device, as described above, lithium-excess concentration-fluctuating clusters are produced by the hydrothermal reaction in the main reactor and go through subsequent processes, the heat exchanger, the de-pressurizer, and the phase separator. At these processes, dissolution of lithium near the surface of the clusters occurs due to the accompanying contact with water. The result is a cluster with excess lithium at its core and deficient lithium at its surface and shell.

The second feed comprises an alkalinizing solution, a lithium-containing solution, a carbon-containing solution, a polymer containing solution, chelating agents, and combinations thereof. The second feed is injected into the thermal jumper 21 at reaction pressure using the second feed pump and then heated between 50° C. and 299° C. by the second feed heater. The second feed heater prevents the precipitation of the second feed, increases energy efficiency, and improves operational stability while maintaining a constant injection temperature to the thermal jumper.

The third feed comprises a metal salt solution, an alkalinizing solution, a lithium-containing solution, a carbon-containing solution, a polymer-containing solution, chelating agents, hydrogen, and combinations thereof. The third feed is injected into the thermal sinker at reaction pressure and room temperature using the third feed pump. As with the thermal jumper, 21, the thermal sinker 23 may define a fluid mixing structure that enables non-gradual temperature decrease by mixing the effluent of the main reactor with the third feed. The third feed can be injected at an angle of 15 degrees to 90 degrees based on the flow direction of the effluent of the main reactor. The vortex can be formed by the fluid flow.

The fourth feed comprises a carbon-containing solution, water, hydrogen, oxygen, carbon dioxide, and combinations thereof. The fourth feed is injected into the thermal jumper at the reaction pressure using the fourth feed pump and at a temperature above the supercritical water temperature by the heat exchanger and the supercritical water heater. The temperature at which the fourth feed enters the thermal jumper is between 370° C. and 700° C., more preferably between 450° C. and 600° C.

The reaction pressure is maintained between 85 bar and 500 bar, more preferably between 120 bar and 300 bar, so that the hydrothermal reaction proceeds with a liquid phase at subcritical temperature or a supercritical phase at supercritical temperature. The reaction temperature is maintained between 300 and 600° C., more preferably between 320° C. and 450° C., so that the hydrothermal reaction proceeds with a liquid phase at subcritical pressure or a supercritical phase at supercritical pressure.

The thermal jumper 21_conducts non-gradual (i.e., non-linear) increases in the temperatures of the first and second feeds to a hydrothermal reaction temperature by the supercritical water supply under a hydrothermal reaction pressure. The thermal jumper 21 avoids plugging or fouling of the first or second feeds by direct fluid mixing with supercritical water, which is the temperature jump source. This prevents the plugging or fouling of the first or second feeds on the fluid passage walls.

To convert feed materials such as lignocellulosic and aquatic biomass into bioenergy and high added-value compounds, hydrothermal processing may be applied. The thermal jumper prevents plugging or fouling that occurs during the heating of this biomass feed.

The metal components that are dissolved in the first feed or the second feed are injected into the thermal jumper and form monocrystalline solid particles under a rapid supersaturation condition as the non-gradual temperature increases.

The main reactor provides a supercritical or subcritical hydrothermal reaction. The main reactor is tubular or vessel shape with or without a mixing part such as impeller or sonicator with or without heating to its fluid passage wall.

The thermal sinker 23 non-gradually decreases the temperature of the effluent from the main reactor via the third feed supply pump 15. The thermal sinker 23 decreases oxygen or forms reduction conditions in the effluent from the main reactor by direct fluid mixing with the third feed.

By the thermal sinker, the temperature of the effluent from the main reactor is lowered or oxygen is reduced, the residence time in the auxiliary reactor and the heat exchanger is increased and corrosion mitigation is achieved.

The auxiliary reactor is maintained below the supercritical water temperature and below the effluent temperature of the main reactor. Reaction temperatures of the auxiliary tubular reactor are between 200° C. and 370° C., and more preferably between 250° C. and 350° C. The auxiliary reactor may be a vessel with or without shut off valves at either or both its downstream and upstream ends, or an elongated open ended structure such as a conduit. In continuous process mode, the shut off valves remain open, or are completely eliminated. For example, when a when a vessel-type auxiliary reactor is utilized, there are no shut off valves at either or both its downstream and upstream ends, and it flows in and out continuously.

The reactor may incorporate a mixing part such as impeller positioned within the interior of the reactor or a sonicator. The interior of the vessel defining a fluid passage wall may be heated or may not be heated.

The heat exchanger cools the effluent from the auxiliary reactor and heats the fourth feed. The supercritical water heater supplies supercritical water solution to the thermal jumper.

A non-gradual rapid (e.g., at least 20° C. per second) temperature rise of the reactants occurs as the supercritical water obtained by a heat exchanger 25 and a supercritical water heater 17 is injected into the heat jumper. The thermal jumper non-gradually (e.g., in a step-wise or otherwise non-linear fashion) increases the temperatures of the aqueous metal salt solution and the basic aqueous solution by supercritical water from room temperature or feed preheating temperature to reaction temperature. Monocrystalline particles are generated in a main (i.e., the first) tubular reactor 22 connected to the thermal jumper as the first step hydrothermal reaction. The reaction temperature of the first tubular reactor is between 300° C. and 500° C., more preferably between 320° C. and 450° C.

The basic aqueous solution comprises an alkalinizing solution, a lithium-containing solution, a carbon-containing solution, a polymer-containing solution, chelating agents, and combinations thereof.

The aqueous metal salt solution may contain a compound selected from the group consisting of metal containing particles or compounds, including but not limited to metal hydroxide particles, metal carbonate particles, metal oxide particles, carbon, polymer, organic additives and combinations thereof. The metal salt solution is used in the first step hydrothermal reaction in the main tubular reactor to generate morphology-controlled monocrystalline particles or their clusters with concentration variations.

Hydrothermal treatment is the objective inasmuch as metal from the metal ion solution is not soluble; rather all of it is converted to crystal. It is noteworthy that the metal never passes through an amorphous phase, such that at all times during the process, the metal generated is in crystal form. These crystal forms are generated immediately upon hydrothermal treatment. The elimination of formation of intermediate amorphous product assures consistency in monocrystalline particle size, sans internal void structures.

To enable the surface modification (concentration-gradation) of the generated monocrystalline particles by the second step hydrothermal reaction at a desirable reaction temperature, a room-temperature solution is injected by a room-temperature solution pump 15 at reaction pressure into a thermal sinker 23 which is connected to or otherwise disposed between the main tubular reactor outlet and an inlet for a second tubular reactor 24 so as to confer fluid communication between the main reactor 22 and the auxiliary reactor 24. The room-temperature solution contains metal salt together with organic additives to generate surface-modified monocrystalline particles by the second step hydrothermal reaction in the auxiliary reactor (i.e., the second tubular reactor 24).

This thermal sinker non-gradually (e.g., at least 20° C. per second) decreases the temperature of the effluent of the main (i.e., first) tubular reactor by the injected room-temperature solution. As such, the thermal dropper/sinker non-gradually decreases the temperature of the effluent of the main tubular reactor by the room-temperature solution.

Downstream of the thermal sinker, and within the second tubular reactor 24 connected to the thermal sinker, surface-modified monocrystalline particles with concentration variation are generated. The reaction temperature of the auxiliary tubular reactor is between 200° and 370°, more preferably between 250° C. and 350° C. The reaction pressure is between 85 bar and 500 bar, more preferably between 120 bar and 300 bar. An exemplary pressure is 221 bar.

The produced monocrystalline particles are discharged to a gas-liquid-solid separator 34 after the heat exchanger and a de-pressurizer 31.

Preferably, the continuous hydrothermal reaction device includes a pressure decrease or letdown apparatus downstream of the main reactor. This optimizes continuous discharge of product continuously while keeping reaction pressure constant within the main reactor at the same time. As such, the de-pressurizer depressurizes and discharges the effluent from the hydrothermal reaction.

However, conventional pressure-reducing regulators are easily plugged by particle sedimentation and further malfunctions when the product contains abrasive solid particles. For example, the abrasive particles may erode the valve seats of pressure-reducing regulators, and this will lead to contamination of the product. This valve seat also makes the particle crack by pressing when synthesized particles discharge through pressure-reducing regulators. A safety hazard is thus created and may halt continuous operation of the process.

As described above, the lithium-excess concentration-fluctuating monocrystalline particles are produced by the hydrothermal reaction in the main reactor. Then, the particles are subjected to subsequent processes, via the heat exchanger, the de-pressurizer, and the phase separator. Specifically, after generating the monocrystalline particles in the main reactor, dissolution of lithium near the surface of particles occurs due to the accompanying contact with water, resulting in lithium-excess-cored and lithium-deficient-shelled concentration-fluctuating monocrystalline particles.

The entire processing time from reactant feeding to product de-pressurizing is between 10 seconds and 60 minutes, preferably between 1 minute and 30 minutes, and more preferably between 2 and 10 minutes.

Particle Topography

And Gradient Detail

Lithium dissolution at each surface of a lithium-excess monocrystalline particle depends on the morphological and crystallographic conditions of the exposed particle surface as well as the mass transfer conditions upon contact with water. Therefore, the lithium-excess-cored and lithium-deficient-shelled monocrystalline particle comprises a lithium concentration change shape selected from the group consisting of a sine wave, a square, step, triangle, saw-tooth, an exponential curve, and combinations thereof inside the particle with respect to its circumferential and radial directions. Also, in the lithium transition metal oxide particle, the concentration change of metal component exhibits a shape selected from the group consisting of a sine wave, a square, step, triangle, saw-tooth, an exponential curve, and combinations thereof with respect to its circumferential and radial directions.

This monocrystalline particle exhibits a shape selected from the group consisting of spherical, non-spherical, elliptical, oval, convex, concave, leaf, needle, plate, polyhedron, sloped polyhedron, slanted polyhedron, curved polyhedron, ellipse, and a combination thereof. This monocrystalline particle comprises a particle size between 0.1 and 20 µm, more preferably between 0.3 and 6 µm. The core part and the shell part of the monocrystalline particle has a thickness ratio from 0.99:0.01 to 0.8:0.2. The lithium-excess-cored and lithium-deficient-shelled concentration-fluctuating monocrystalline particles are used as cathode materials with or without granulation for a lithium secondary battery.

This lithium transition metal oxide particle comprises both a lithium-excess transition metal oxide core (having a Li/transition metal molar ratio of more than 1) as produced during the hydrothermal reaction and a lithium-deficient transition metal oxide shell (having a Li/transition metal molar ratio of less than that of lithium-excess transition metal oxide core) as produced by removing lithium from the surface of lithium-excess concentration-fluctuating monocrystalline particle by subsequent water contact during cooling and separation. For example, water contact of the lithiated particle removes $Li_2CO_3$ and LiOH surface impurities and also modifies the near-surface bulk properties of the lithiated particle by an $Li^+/H^+$ ion exchange between the lithiated particle and the washing water. This results in the particle having less lithium concentration at the near-surface bulk than at the core, leading to very different near-surface structures in the subsequent heat treatment step. Significant $Li^+/H^+$ ion exchange of the lithiated particle by water contact produces a near-surface layer with varying Li/transition metal molar ratios in the layered oxide structure according to its particle shape.

This lithium transition metal oxide particle comprises at least two concentration-fluctuating metal components having concentration changes with respect to the circumferential and radial directions of the particle.

The monocrystalline battery material produced by the present invention is shown in the scanning electron microscope image of FIG. 3A. Specifically, FIG. 3A is an SEM image of lithium-excess-cored and lithium-deficient-shelled concentration-fluctuating monocrystalline NMC811 cathode material synthesized via the invented hydrothermal manufacturing method. The SEM image reveals a robust structure having a particle size of about 1 micron. FIG. 3B is an enlarged view of the monocrystalline particle.

Two-dimensional X-ray (nanoprobe) Fluorescence (XRF) imaging is a powerful characterization tool to investigate elemental distributions, chemical inhomogeneity in a wide range from several tens nm to several tens μm scale. Looking at the two dimensional X-ray nanoprobe fluorescence imaging result (FIG. 4) of the actually synthesized monocrystalline NMC811, the abrupt concentration-gradient changes of the compositions is evident.

Figure 4:
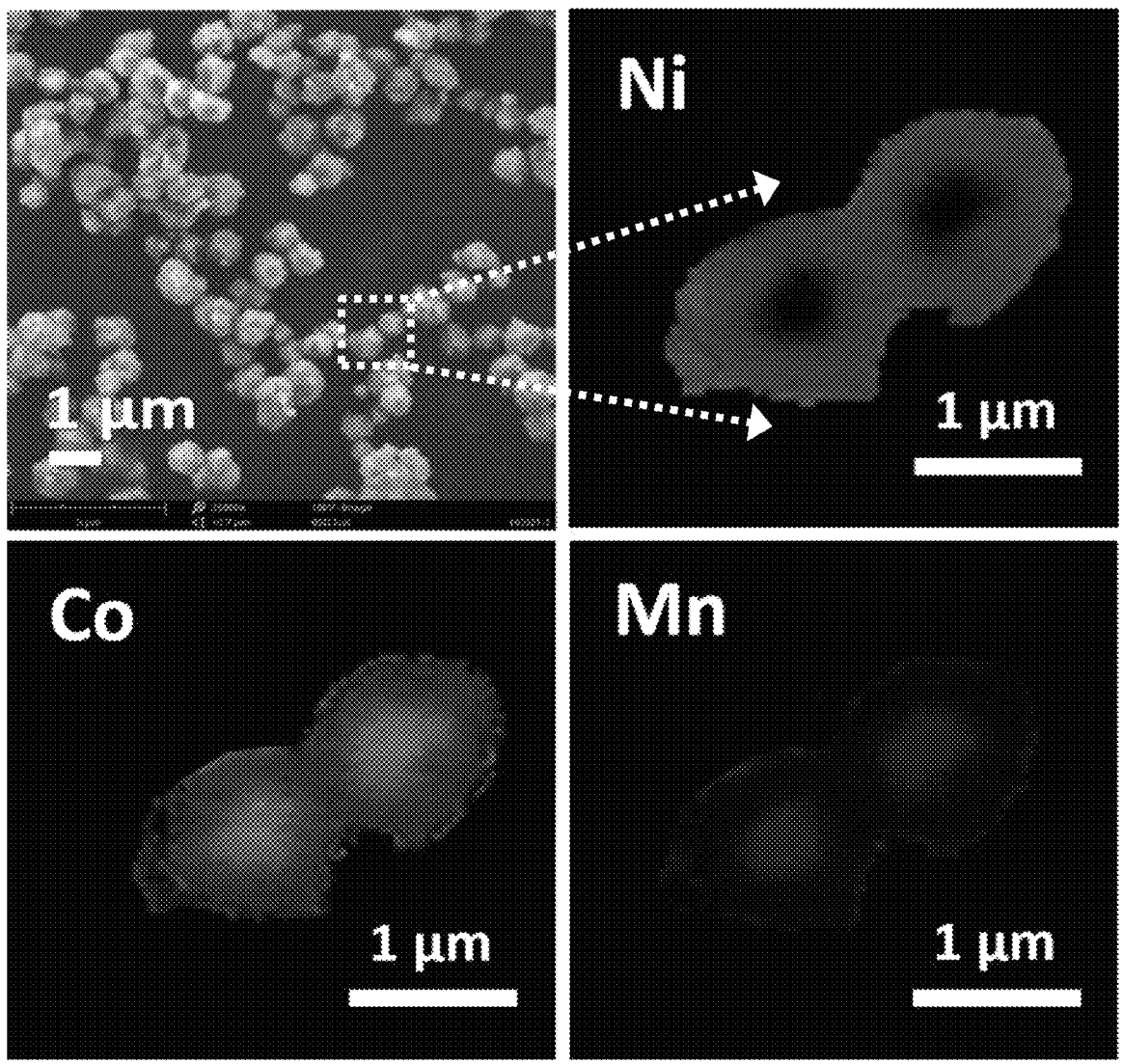
FIG. 4 is a series of the X-ray Fluorescence (XRF) tomography images of the lithium-excess-cored and lithium-deficient-shelled concentration-fluctuating monocrystalline NMC811 cathode material prepared in accordance with features of the present invention.

The images in FIG. 4 reveal the relative concentration distribution of metal components in the monocrystalline NMC811 particle. Specifically, the red image labeled "Ni" represents more nickel concentration on the shell versus within the core of generated particles. It should be noted that the image represents relative concentrations such that less nickel is contained in the less colorized core than in the more vibrant colorized shell. As can be seen in this XRF image, the concentration change is not linear but rather stepwise (i.e., nonlinear).

The green image labeled "Co" represents that cobalt is present in a higher concentration in the particle center than the particle surface. As such, the concentration of Cobalt in the particle increases abruptly (e.g., in a stepwise fashion) from shell to core.

. The blue image in FIG. 4 labeled "Mn" represents that manganese concentration is clearly distinguished in the particle core and in the particle shell. FIG. 4 reveals that at least one concentration change of constituents of the monocrystalline particle from the core to the surface. As with the XRF images for nickel and Co, the concentration changes are non-linear. In the instance of the Mn image, the concentration changes are sinus wave in nature, going from maximum, to minimum, then to maximum again.

The core of the monocrystalline NMC811 particle may be manganese-rich and cobalt-rich, and its surface may define a nickel-rich concentration distribution.

The lithium-excess transition metal oxide core may comprise the formula $Li_{a1}Ni_{x1}Co_{y1}Mn_{z1}M_{w1}O_2+\delta1$ and M is selected from the group consisting of B, C, F, Na, Mg, Al, Si, P, S, Ca, Ti, V, Cr, Fe, Cu, Zn, Ga, Ge, Sr, Zr, Nb, Mo, Ag, Sn, Ba, La, W, Ta or combinations thereof, and $1<a1\leq2$, $0\leq x1\leq1$, $0\leq y1\leq1$, $0\leq z1\leq1$, $0\leq w1\leq1$, $0\leq\delta1\leq1$, $0\leq x1+y1+z1\leq1$. The lithium-deficient transition metal oxide shell may comprise the formula $Li_{a2}Ni_{x2}Co_{y2}Mn_{z2}M_{w2}O_2+\delta2$, wherein M is selected from the group consisting of B, C, F, Na, Mg, Al, Si, P, S, Ca, Ti, V, Cr, Fe, Cu, Zn, Ga, Ge, Sr, Zr, Nb, Mo, Ag, Sn, Ba, La, W, Ta and combinations thereof, and $0\leq a2<a1$, $0\leq x2\leq1$, $0\leq y2\leq1$, $0\leq z2\leq1$, $0\leq w2\leq1$, $0\leq\delta2\leq1$, $0\leq x2+y2+z3\leq1$.

Figure 5:
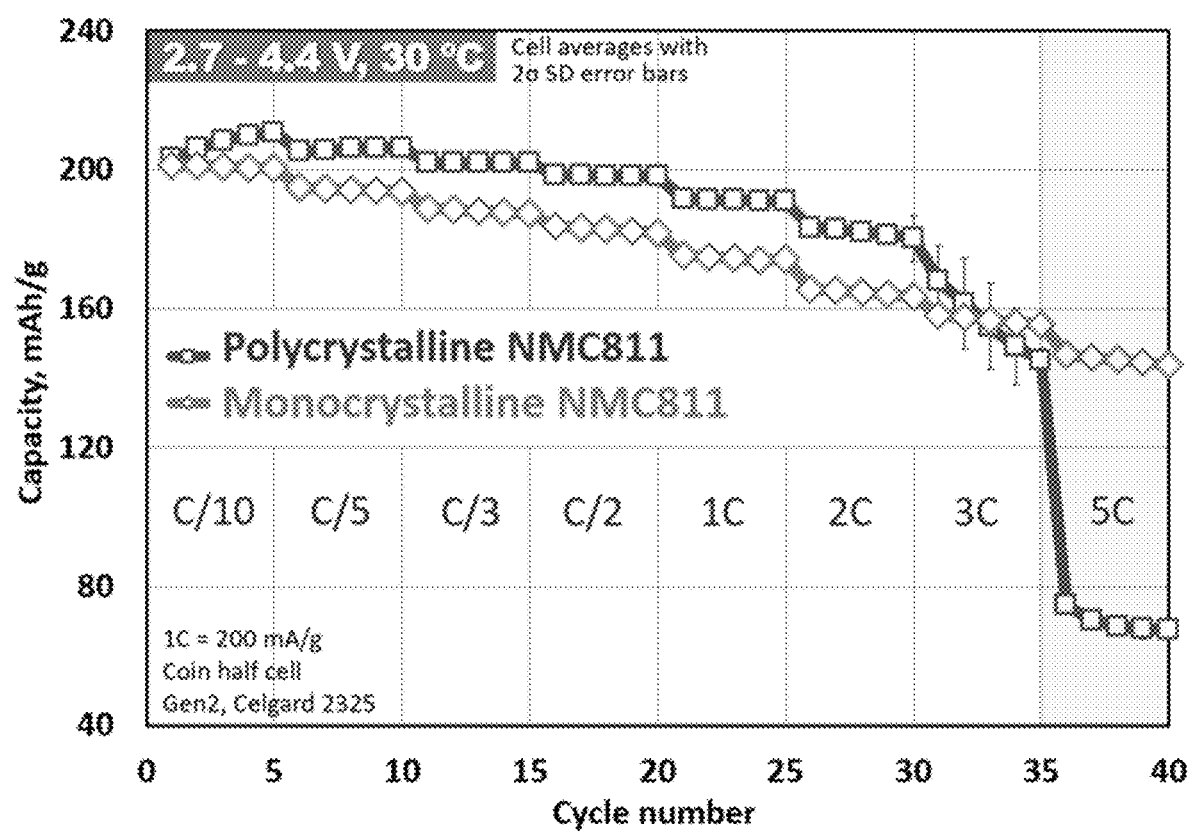
FIG. 5 is a graph demonstrating the electrochemical cycling performance and rate capability for lithium secondary batteries including each active battery material prepared in accordance with features of the present invention, compared to state of the art material.

FIG. 5 shows that the invented concentration-gradient monocrystalline (NMC811) has more than twice the discharge capacity and stable cycling performance at a high C-rate than state of the art polycrystalline NMC811.

The created lithium-excess-cored and lithium-deficient-shelled concentration-fluctuating monocrystalline NMC811 cathode particles subsequently may be treated by spray granulation and/or rotational granulation to form a cluster (42 in FIGS. 6 and 7), which are separate downstream processes.

FIGS. 6 and 7 are schematic views of a plurality of monocrystalline particles, 40 defining a larger cluster 42 or agglomeration. The monocrystalline particles may average in diameter from 1 to 20 microns (μm) but when smaller diameter monocrystalline particles (no larger than 3 μm) are consistently utilized, the cluster size is limited to between 5 microns and 50 microns in diameter. These larger diameter clusters 42 may be particularly advantageous for providing higher packing densities, and therefore, higher volumetric charge and discharge capacity of batteries.

FIG. 6A illustrates a cluster composed of lithium-excess-cored and lithium-deficient-shelled metal-concentration-fluctuating monocrystalline particles. FIG. 6B and C shows one type of monocrystalline particle synthesized by the invented hydrothermal process; its cluster FIG. 6A subsequently formed by the granulation process. FIG. 6B is a schematic drawing of a monocrystalline particle showing relative lithium concentrations on its shell versus its core. FIG. 6C shows circumferential and radial gradients of metal components within the monocrystalline particle. It is noteworthy that if the constituent monocrystalline particles have a particular concentration change (for example decreasing lithium concentration from core to shell), then the cluster composed of the monocrystalline particles have the same concentration change.

FIG. 7A illustrates a lithium-excess-cored and lithium-deficient-shelled cluster composed of metal-concentration-fluctuating monocrystalline particles (FIG. 7B and C). The core part and the shell part of the cluster may have a thickness ratio from 0.99:0.01 to 0.7:0.3.

Thermal Jumper/Thermal Sinker Detail

The thermal jumper 21/sinker 23 can be of any type of fluid mixing structure that enables non-gradual temperature increase or decrease. In the case of the jumper, thermal increase occurs by mixing the first feed and the second feed injected at sub-critical temperature with supercritical water. The first feed, the second feed, and supercritical water can be injected at an angle of 15 degrees to 90 degrees relative to the flow direction of the longitudinal or central axis of the jumper 21. A mixing vortex is formed by the tangential injection. An embodiment of the thermal jumper may define three ingress ports for the first feed, the second feed and the supercritical water, and an egress port for expulsion of the heat-treated mixture from the jumper 21.

FIG. 8A is a schematic drawing of a thermal jumper with three tangential injections generating vortex flow. A side view shows the central mixing axis (e.g., a longitudinal axis) as a dashed line. In an embodiment of the jumper, the injection angle in FIG. 8A may be between the 15 and 90 degrees discussed above (for example between 45 and 90 degrees), and preferably between approximately 30 degrees and 60 degrees. Inasmuch as three means of fluid ingress are featured in FIG. 8A, each means may be at approximately a 60 degree inflow angle relative to each other so as to maximize initial mixing.

FIG. 8B is a schematic drawing of a thermal jumper with one central injection and two tangential injections generating vortex flow. The injection angle in FIG. 8B is between approximately 45 degrees and 90 degrees. There are two means of fluid ingress with each means positioned at approximately a 180 degree inflow angle relative to each other.

The effluent from the main reactor is centrally injected into the thermal sinker. The third feed can be tangentially injected into the thermal sinker at an injection angle of between 15 degrees to 90 degrees relative to the flow direction of their mixture. A mixing vortex is formed by the tangential injection.

FIG. 8C is a schematic drawing of a thermal sinker with one central injection and one tangential injection generating vortex flow.

The injection angle in FIG. 8C is between approximately 45 degrees and 90 degrees. Thermal decrease occurs by mixing the effluent from the main reactor with the third feed of room temperature.

In an embodiment of the system depicted in FIG. 2, the system pressure starting from the feed inlet pump (11, 13, 15, 16) to the de-pressurizer 31 remains the same as the reaction pressure. The injection pressures of fluids to the thermal sinker are the same as reaction pressure.

De-pressurizer Detail

The inventors have developed a de-pressurizer comprising a capillary tube, pressure-reducing regulator, and combinations thereof. This takes advantage of the phenomenon that a pressure drop occurs when fluid passes through a tube with a sufficiently small inner diameter at a high speed. The inventors also discovered that incorporating a capillary tube as a de-pressurizer minimizes malfunction, plugging, erosion, and particle crack during pressure letdown.

Utilization of a capillary tube design, and particularly of a design which defines progressively smaller diameters, enhances Venturi effect on the reduction in fluid pressure. In the Venturi effect, the large increase in velocity through a constriction causes a marked reduction in pressure, with the size of this reduction depending on the size of the velocity increase and therefore on the degree of constriction. In essence, the depressurizer as described below embodies the Venturi effect. This Venturi treatment eliminates or at least minimizes cracking of the particles generated during final cooling and isolation steps.

While dimensions of the capillary tube will vary empirically with product volume and flow, for a product flow of about 10 liters (L) per minute, a single capillary tube 32 (FIG. 9A, B) with an inner diameter between 1 and 15 mm, more preferably between 2 and 7 mm is suitable. The capillary tube can be a single tube, or a plurality of tubes (FIG. 9C) with two or more inner diameters connected in series, as depicted in, 9D, discussed infra.

The total length of the capillary tube is between 20 m and 400 m, more preferably between 50 m and 200 m.

The de-pressurizer 31 is a combination of capillary tubes 32 with an inner diameter between 1 and 15 mm (more preferably between 2 and 7 mm), and pressure-reducing regulators. In an embodiment of the invention, the de-pressurizer comprises a plurality of capillary tubes 32 and pressure reducing regulators 33. The phase separator separates the reaction product into each phase. Item 32 in the figure may comprise a capillary tube bundle which is coiled. (For example, two or more capillary tubes of different diameters may be connect in a series to form a continuous, fluid conduit, FIG. 9D.) The conduit diameter may decrease as the fluid advances downstream, increase, or first decrease, then increase along its longitudinally extending regions downstream.

Figure 9:
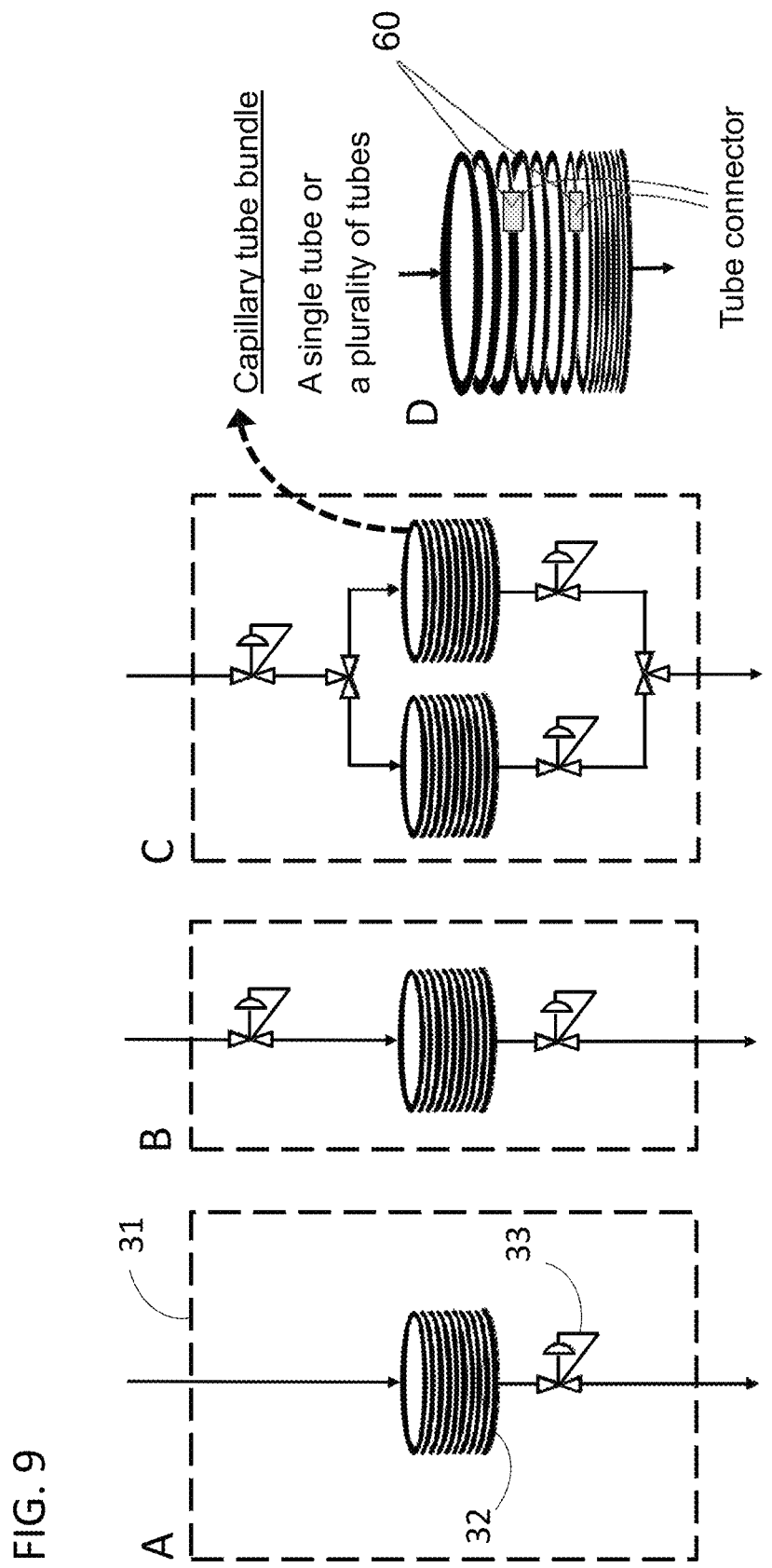
FIG. 9A is a schematic drawing of a de-pressurizer with a capillary tube and a single pressure reducing regulator, in accordance with features of the present invention.
FIG. 9B is a schematic drawing of a de-pressurizer with a capillary tube and two pressure reducing regulators, in accordance with features of the present invention.
FIG. 9C is a schematic drawing of a de-pressurizer with two capillary tubes and three pressure reducing regulators, in accordance with features of the present invention.
FIG. 9D depicts three coiled capillary tubes connected in series with each tube depicting different tube diameters, in accordance with features of the present invention.

FIG. 9C depicts two capillary tube bundles. The tubes may be circular and stacked upon each other as shown.

The top figure in FIG. 9D shows a stack of tubes of a diameter greater than the middle and bottom figure. FIG. 9D also shows a connector 60 or a plurality of connectors such as a conduit between the terminating end of a first tube and the opposing, ingress end of a second tube positioned downstream from the first tube. The connectors 60 confer fluid communication between each of the series-arranged tubes.

Preparation Example 1

Preparation of Lithium-excess-cored and Lithium-deficient-shelled Concentration-fluctuating Monocrystalline NMC811 Cathode Material Stoichiometric quantities of $Ni(CH_3COO)_2 \cdot 4H_2O$, $Co(CH_3COO)_2 \cdot 4H_2O$, and $Mn(CH_3COO)_2 \cdot 4H_2O$ were dissolved in distilled water with the molar ratio of 8:1:1. KOH, $NH_4OH$, and LiOH solutions were prepared. The solutions were mixed under a reaction temperature of about 380° C. and a reaction pressure of about 230 bar.

Figure 3:
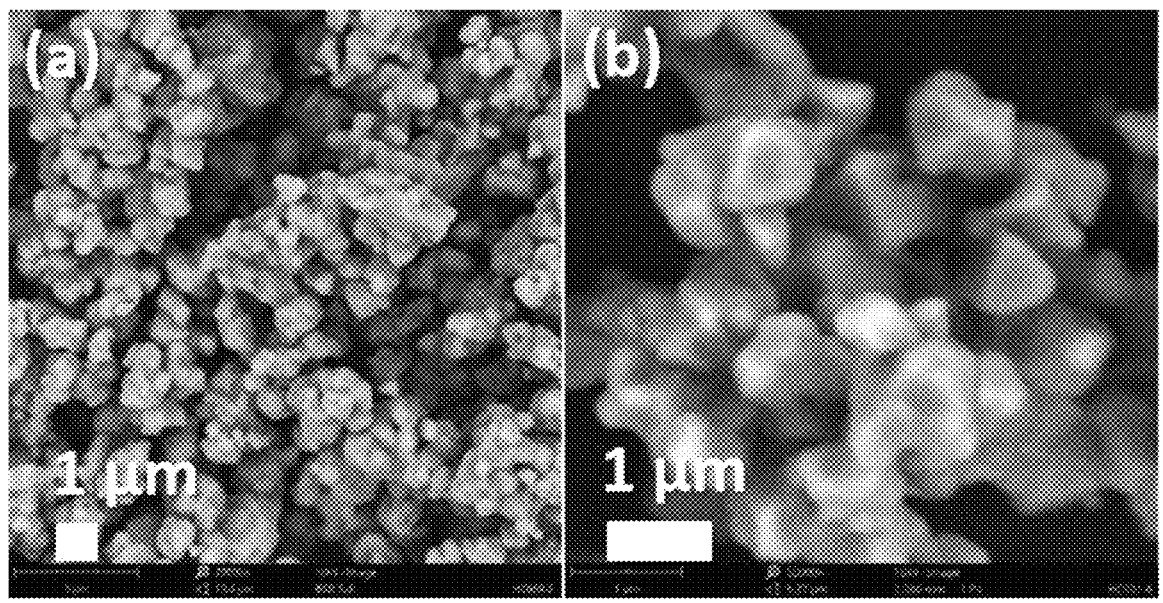
FIG. 3A is an SEM image of the invention's lithium-excess-cored and lithium-deficient-shelled concentration-fluctuating monocrystalline particle, in accordance with features of the present invention.
FIG. 3B is an enlarged view of FIG. 3A.

After the hydrothermal reaction, lithium-excess concentration-fluctuating monocrystalline NMC811 particles were obtained and the surface lithium was removed by subsequent water contact during cooling and separation. The produced material was dried in a vacuum oven at approximately 100° C. overnight after filtration. Afterward, heat treatment was carried out to remove the moisture of the product. The powder thus obtained was sieved to prepare the lithium-excess-cored and lithium-deficient-shelled concentration-fluctuating monocrystalline NMC811 cathode particles. These produced particles are shown in FIG. 3.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein," Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A continuous method for preparing monocrystalline material, the method comprising:
   a) supplying an aqueous metal salt solution and a lithium-containing basic aqueous solution having chelating agents, wherein both solutions are maintained separately at ambient temperature;
   b) mixing the aqueous metal salt solution and the basic aqueous solution together using supercritical water, wherein the mixing occurs in a structure defining a central mixing axis, wherein the mixing is performed by injecting the supercritical water tangential to the central mixing axis to create a vortex mixture and the tangentially injected supercritical water establishes first hydrothermal reaction conditions to form lithiated monocrystalline particles, wherein each of the particles has a surface and a core; and
   c) subjecting the monocrystalline particles with second hydrothermal reaction conditions to modify surfaces of the monocrystalline particles, wherein a second hydrothermal reaction temperature is lower than a first hydrothermal reaction temperature.

2. The method as recited in claim 1 wherein the aqueous metal salt solution contains a compound selected from the group consisting of metal particles, metal hydroxide particles, metal carbonate particles, metal oxide particles, carbon, polymer, organic additives, and combinations thereof.

3. The method as recited in claim 1 wherein:
   between the mixing and subjecting steps the monocrystalline particles are mixed with a tangentially injected room temperature fluid selected from the group consisting of a metal salt solution, an alkalinizing solution, a lithium-containing solution, a carbon-containing solution, a polymer-containing solution, chelating agents, hydrogen, and combinations thereof, and the room temperature fluid is injected at a location between a main tubular reactor outlet and an auxiliary tubular reactor inlet to modify the surfaces of the monocrystalline particles from the main tubular reactor.

4. The method as recited in claim 3 wherein the tangentially injected room temperature fluid creates a vortex around the central mixing axis to decrease the temperature of the monocrystalline particles at a rate of between 20° C. per second and 400° C. per second.

5. The method as recited in claim 3 wherein the monocrystalline particles are lithiated at the first hydrothermal reaction conditions and partially de-lithiated at the second hydrothermal reaction conditions to decrease lithium concentration at the surface relative to lithium concentrations at the core wherein the average lithium concentration at the surface is 95-99 percent of the lithium concentration at the core.

6. The method as recited in claim 5 wherein the surface defines a shell, and the core and shell have a thickness ratio ranging from 0.99:0.01 to 0.8:0.2.

7. The method as recited in claim 1 wherein the second hydrothermal reaction is terminated when the modified monocrystalline particles first pass through a plurality of capillary tubes and then at least one pressure reducing regulator.

8. The method as recited in claim 1 wherein a vortex fluid flow is created by the tangential injection to increase the temperatures of the aqueous metal salt solution and the lithium containing basic aqueous solution at a rate of between 20° C. per second and 400° C. per second.

9. The method as recited in claim 1 wherein the first hydrothermal reaction conditions comprise temperatures of between 300° C. and 600° C. and a pressure between 85 bar and 500 bar.

10. The method as recited in claim 1 wherein the second hydrothermal reaction conditions comprise temperatures of between 200° C. and 370° C. and a pressure between 85 bar and 500 bar.

11. The method as recited in claim 1 wherein the tangential injection occurs at an injection angle of between 15 degrees to 90 degrees relative to a flow direction of the mixture.

12. The method as recited in claim 1 wherein the second hydrothermal reaction conditions are removed by subjecting the modified monocrystalline particles to the Venturi effect.

13. The method as recited in claim 7 wherein the monocrystalline material is formed between 10 seconds and 60 minutes.

* * * * *